Dec. 25, 1962 W. J. YOUNG 3,070,209
CAP SORTER
Filed July 9, 1959 4 Sheets-Sheet 1

INVENTOR.
William J. Young
BY
Robert S. Sanborn
Attorney.

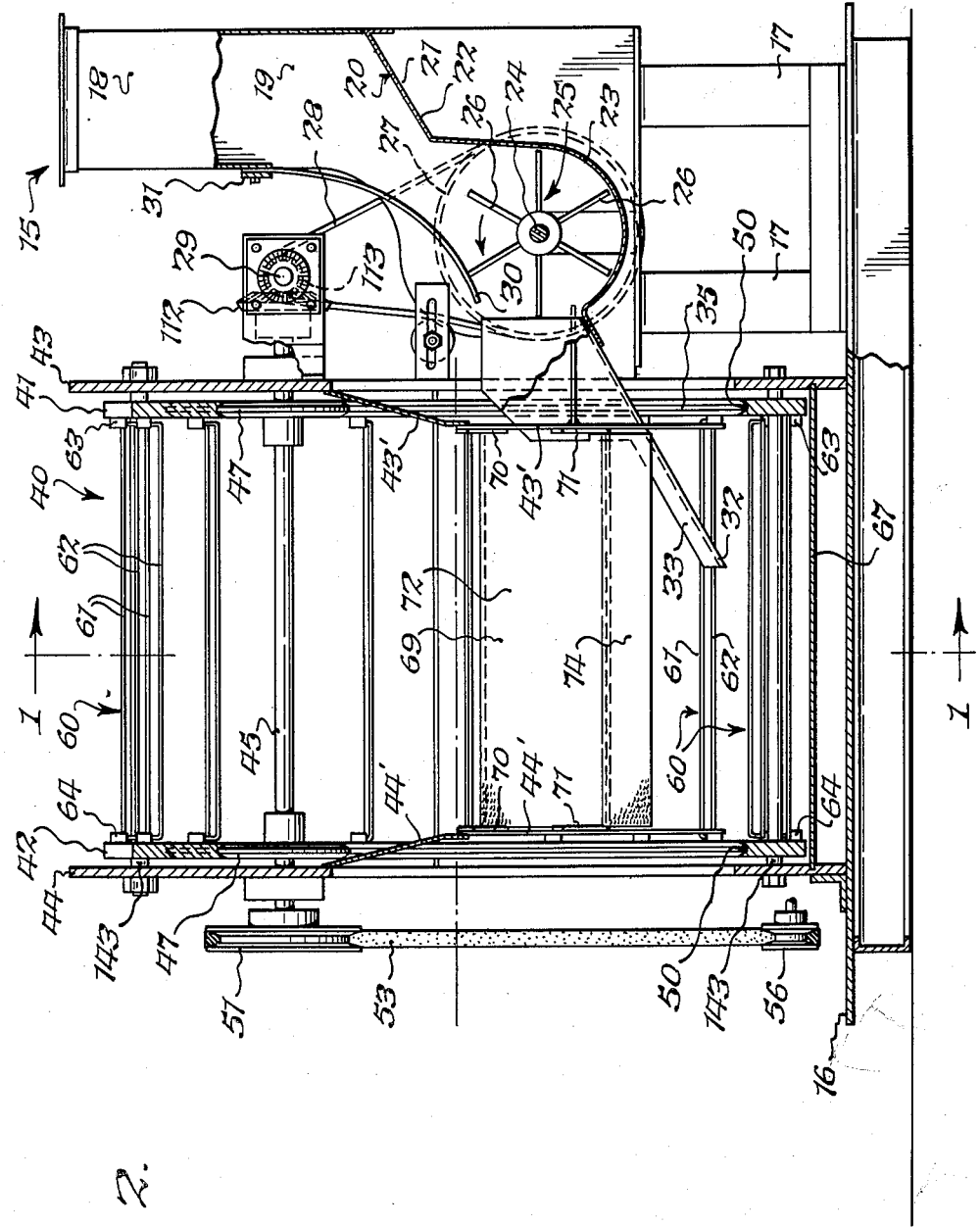

Dec. 25, 1962  W. J. YOUNG  3,070,209
CAP SORTER
Filed July 9, 1959  4 Sheets-Sheet 3
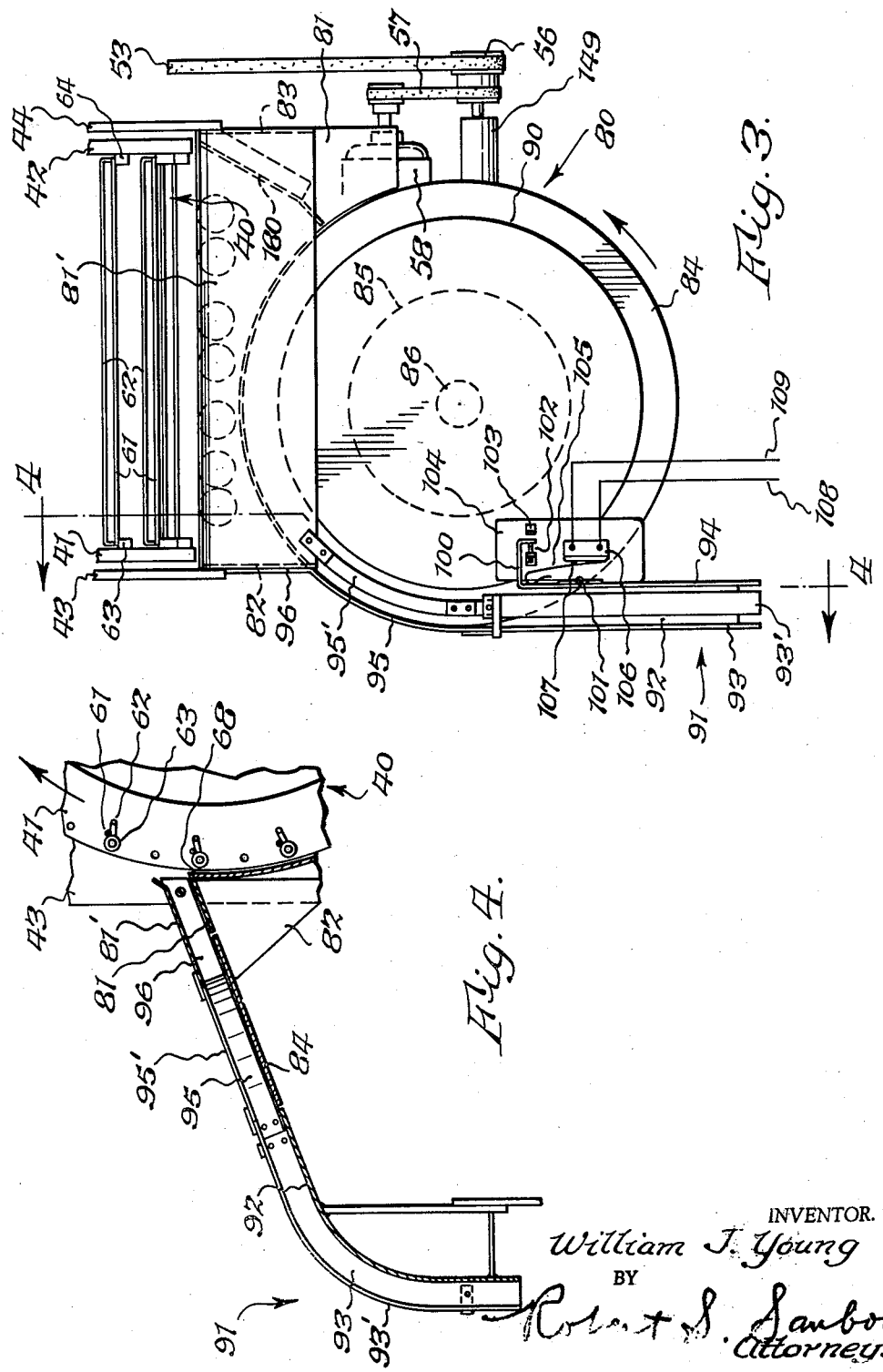
INVENTOR.
William J. Young
BY
Robert S. Sanborn
Attorney.

Dec. 25, 1962
W. J. YOUNG
3,070,209
CAP SORTER
Filed July 9, 1959
4 Sheets-Sheet 4
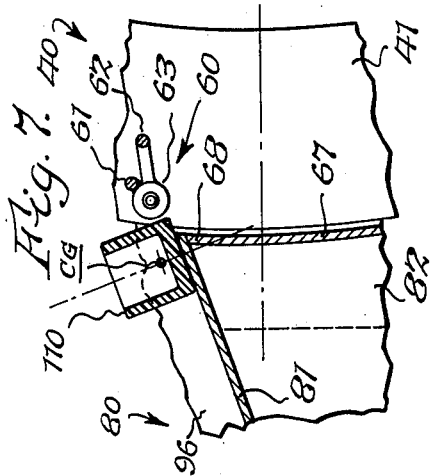
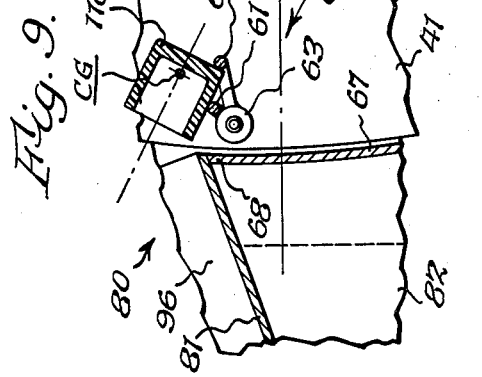
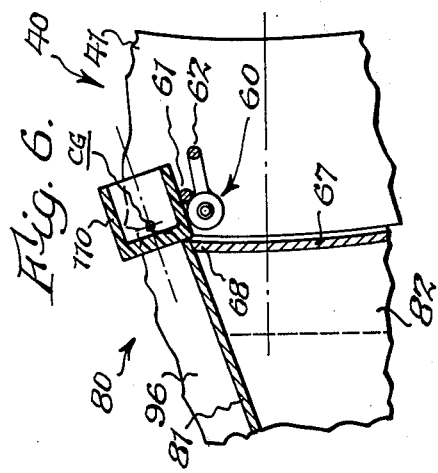
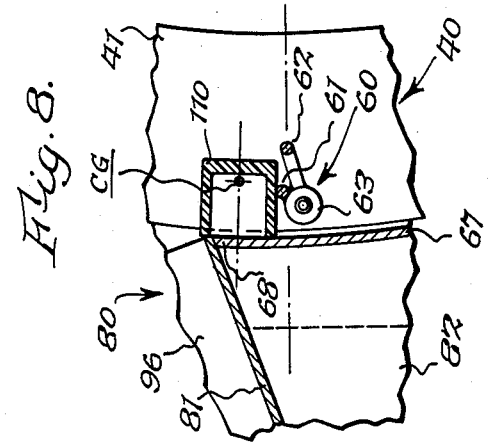
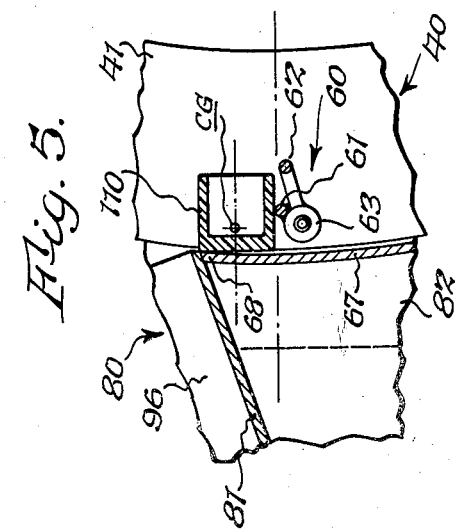
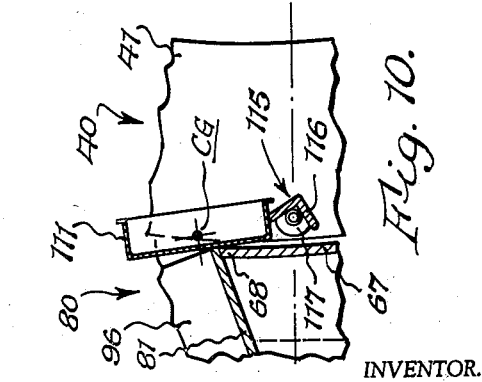
INVENTOR.
*William J. Young*
BY
*Robert S. Sanborn*
*Attorney.*

United States Patent Office 3,070,209
Patented Dec. 25, 1962

3,070,209
CAP SORTER
William J. Young, Buffalo, N.Y., assignor to Consolidated Packaging Machinery Corporation, Buffalo, N.Y., a corporation of New York
Filed July 9, 1959, Ser. No. 825,986
10 Claims. (Cl. 198—33)

This invention relates to ordering apparatus and more particularly to such apparatus of the type which is adapted to arrange a plurality of articles in a uniform and a discriminate manner.

Ordering apparatus of the type to which the present invention is directed is particularly suited for arranging a random supply of articles in accordance with a predetermined orientation. Thus, for example, such apparatus may be used to position a plurality of container caps or like devices in a uniform row with the openings of all of the caps facing in a given direction.

Heretofore, machines previously employed for this purpose have exhibited several disadvantages. For example, it frequently is desirable to quickly and easily adjust the ordering apparatus to accommodate articles of varying sizes and shapes, and many such previous machines have proved deficient in this respect. Additionally, in machines of the type heretofore employed, the relatively slow rate at which the articles are oriented has impaired the use of such machines for many purposes. Furthermore, and this has been of special moment in cases where the articles to be oriented are relatively unstable, frequent jamming of these articles often has resulted heretofore in damage to the articles or injury to the machine.

One general object of this invention, therefore, is to provide new and improved apparatus for ordering a plurality of articles which is particularly adaptable for arranging the articles in a uniform and discriminate manner.

More specifically, it is an object of this invention to provide such apparatus which is adapted to properly orient a plurality of articles from a random supply thereof at a maximum rate.

Another object of this invention is to provide an ordering apparatus of the character indicated which is quickly and easily adjustable to accommodate groups of articles of widely varying dimensions.

A further object of this invention is to provide an ordering apparatus which automatically responds to a jamming of the articles being oriented in a manner such that damage to the articles or injury to the apparatus is avoided.

Still another object of this invention is to provide an ordering apparatus utilizing comparatively simple mechanical elements, which apparatus is economical to manufacture and thoroughly reliable in operation.

In one illustrative embodiment of this invention, an apparatus for ordering a plurality of articles comprises a cylinder into which a random supply of the articles is fed. The cylinder is rotatable on a horizontal axis and includes a pair of spaced-apart, vertical side walls which are interconnected by a plurality of elongated members disposed in spaced relationship along the periphery of the side walls. A semi-cylindrical trough is positioned without and concentric with the cylinder adjacent the lower portion thereof and extends upwardly at one side to form a discharge lip. Upon rotation of the cylinder, the elongated members advance the articles to be ordered along the trough toward the discharge lip in a manner such that only those articles of the selected orientation are discharged therefrom while the improperly oriented articles are returned to the lower portion of the cylinder. Means adjacent the discharge lip receives the properly oriented articles and arranges them in a uniform row.

In accordance with one feature of this invention, each of the elongated members is adapted to carry a plurality of the articles to be ordered from the lower portion of the cylinder toward the discharge lip in a manner such that a large number of articles can be properly arranged in accordance with the selected orientation during each revolution of the cylinder.

In accordance with another feature of the invention, the side walls of the cylinder are of annular configuration, and the cylinder is supported and driven by rotatable members disposed in frictional engagement with the inner cylindrical surfaces of these side walls. Upon a jamming of an article being ordered, such as between one of the elongated members and the trough, for example, the cylinder lifts slightly, and slippage occurs between the cylinder and the rotatable members. The elongated member rides over the jammed article, and the cylinder automatically returns to its initial position, thereby avoiding damage to the apparatus and the article without substantial interruption of the ordering operation.

In accordance with still another feature of the invention, the apparatus may be adjusted in a rapid and straightforward manner to enable the ordering of articles of widely varying dimensions.

In accordance with a further feature of the invention, in some embodiments, the means for receiving the properly oriented articles from the discharge lip of the trough is of a construction such that when the supply of articles thereadjacent builds up to substantially fill the receiving means, this condition is immediately detected and the apparatus is automatically shut down.

The present invention as well as further objects and features thereof will be understood more clearly and fully from the following description of a preferred embodiment thereof, when read in conjunction with the accompanying drawings in which:

FIGURE 2 is a view, partially in section and partially in elevation, taken generally along the lines 2—2 in FIGURE 1;

FIGURE 3 is a plan view of a portion of the apparatus, as viewed along the lines 3—3 in FIGURE 1, together with certain additional parts;

FIGURE 4 is a sectional view taken generally along the lines 4—4 in FIGURE 3;

FIGURES 5, 6 and 7 are enlarged sectional views similar to FIGURE 4 but illustrating a representative article as it is arranged in accordance with a selected orientation;

Figure 1:
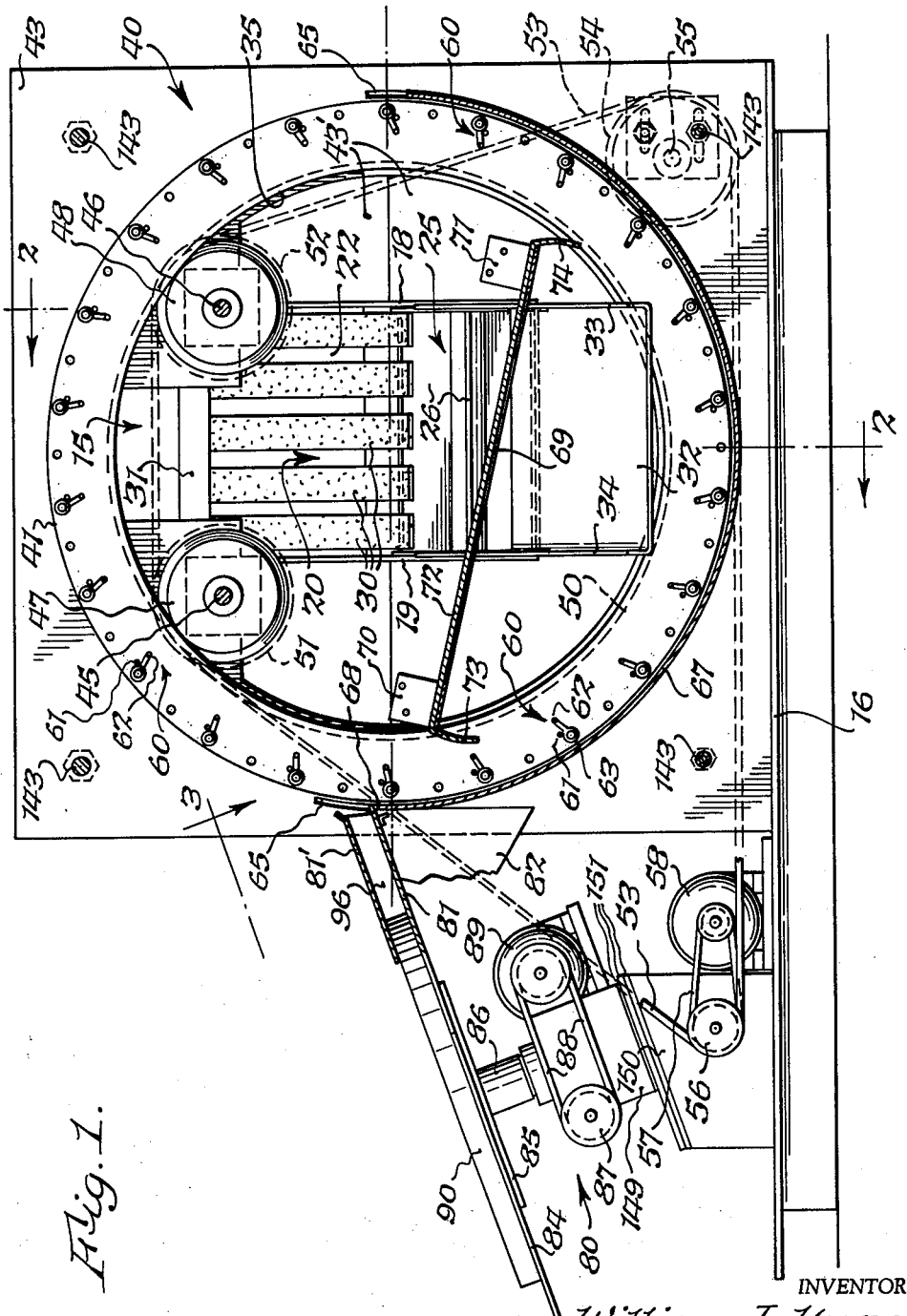
FIGURE 1 is a view, partially in section and partially in elevation, of a preferred ordering apparatus constructed in accordance with the invention, taken generally along the lines 1—1 in FIGURE 2.

FIGURES 8 and 9 are enlarged sectional views similar to FIGURES 5, 6 and 7 but illustrating a representative article in an improperly oriented position; and FIGURE 10 is an enlarged sectional view similar to FIGURES 5, 6 and 7 but illustrating certain alternative components that may be employed in connection with the invention, together with another representative article as it is arranged in accordance with a selected orientation.

Referring initially to FIGURES 1 and 2 of the drawings, there is shown a delivery hopper 15 which is adapted to receive a random supply of container caps (not shown in FIGURES 1 and 2) or other articles to be ordered. The hopper 15 is suitably supported above a base or table 16, such as by legs 17, and includes a pair of spaced side walls 18 and 19 and a bottom wall 20. The bottom wall 20 is positioned between the walls 18 and 19 and is disposed in grooves 21 in the inner surfaces thereof.

As best shown in FIGURE 2, the bottom wall 20 includes a gravity feed portion 22 and an arcuate shaped portion 23. The portion 22 is inclined and has a slope sufficient to permit container caps deposited in the hopper 15 to move toward the arcuate portion 23. The portion 23 is in the form of a trough which is disposed at the lower edge of the portion 22 and is substantially concentric with a rotatable shaft 24 journaled in the side walls 18 and 19.

A metering wheel 25 is keyed or otherwise rigidly affixed to the shaft 24 and is adapted to rotate in a counterclockwise direction, as viewed in FIGURE 2, upon rotation of the shaft. The wheel 25 is provided with a plurality of paddle arms 26 which extend radially therefrom. As will be more fully explained hereafter, the metering wheel shaft 24 is adapted to rotate at a relatively constant speed and is driven by a pulley 27 affixed thereto. A V-belt 28 connects the pulley 27 with a pulley (not shown) mounted adjacent the end of a shaft 29.

A plurality of elongated deflectors 30 are disposed above the arms 26 on the wheel 25 and are each connected at one end thereof to the hopper 15 by a bracket 31 or other appropriate means. The deflectors 30 preferably are fabricated from a relatively flexible material, such as heavy canvas, for example, and the opposite ends thereof curve downwardly into contact with the upwardly directed arms 26 of the metering wheel 25.

A delivery chute 32 is rigidly affixed to the arcuate portion 23 of the bottom wall 20 along the longitudinal edge of the portion 23 opposite that adjacent the gravity feed portion 22. The chute 32 includes oppositely disposed side walls 33 and 34 and is inclined downwardly in order that container caps or other articles may slide freely thereon.

The lower portion of the delivery chute 32 extends through a delivery opening 35 in a cylindrical cage indicated generally at 40. The cage 40 is adapted to rotate in a clockwise direction about a horizontal axis, as viewed in FIGURE 1, and includes a pair of spaced, annular side walls 41 and 42 which are each provided with a circular groove 50 disposed along the inner cylindrical surface thereof. The annular configuration of the side wall 41 forms the delivery opening 35. The side walls 41 and 42 are aligned in parallel relationship with each other and with two upstanding support plates 43 and 44. The support plate 43 is disposed adjacent the side wall 41 on the outside of the cage 40 and is rigid affixed to the table 16, while the support plate 44 is similarly positioned adjacent the side wall 42 and is likewise secured to the table 16. Rotatably mounted adjacent the upper portion of the cage 40 are two shafts 45 and 46 which are journaled at their opposite ends in the plates 43 and 44. A first pair of drive rollers 47 is affixed to the shaft 45, and the rollers 47 are disposed in frictional engagement with the side walls 41 and 42, respectively. In a similar manner, a second pair of drive rollers 48 is mounted on the shaft 46, and rollers 48 frictionally engage respective side walls 41 and 42. The circumferential surface of each of the drive rollers 47 and 48 is tapered and is disposed in the groove 50 of the adjacent side wall.

Pulleys 51 and 52 are respectively affixed to the shafts 45 and 46 at adjacent ends thereof and are adapted to accommodate a V-belt 53. The belt 53 extends over the upper portion of each of the pulleys 51 and 52, as viewed in FIGURE 1, and around an adjustable idler pulley 54 which is supported on a shaft 55 journaled in the support plate 44. The belt 53 then follows a path from the idler pulley 54, around a drive pulley 56 and back to the pulleys 51 and 52. The pulley 56 is adapted to be driven through a V-belt 57 by a motor 58 mounted on the table 16, as will be described more fully hereafter.

Connected between the cage side walls 41 and 42 are a plurality of elongated members 60 which extend horizontally in a direction parallel to the axis of the cage 40 and are disposed at spaced intervals along the periphery of the walls 41 and 42. As shown in detail in FIGURES 5 through 9, each of the elongated members 60 includes two parallel rods 61 and 62 which are supported at the ends thereof by bosses 63 and 64. The boss 63 for each member 60 is mounted adjacent the periphery of the side wall 41, and one end of the rod 61 is welded or otherwise rigidly affixed to the cylindrical surface of this boss. The other end of the rod 61 is similarly secured to the boss 64 which is mounted adjacent the periphery of the side wall 42. The bosses 63 and 64 are each rotatably positioned on the respective side wall by means of a cap screw (not shown) or other suitable means. The rod 62 for each member 60 is bent at right angles adjacent each of its ends, and the ends are disposed in appropriate apertures (not shown) in the cylindrical surfaces of the bosses 63 and 64, respectively, at a point on these surfaces immediately adjacent the corresponding ends of the rod 61. Thus, the longitudinal axes of the rods 61 and 62 are each displaced from the axial centers of the bosses 63 and 64 with the axis of the rod 62 disposed at a greater distance from these axial centers than the axis of the rod 61, for purposes that will become apparent hereafter.

As best shown in FIGURE 1, the support plates 43 and 44 are provided with arcuate grooves 65 (only the groove 65 on the plate 43 being visible in FIGURE 1) on their respective inner surfaces. The grooves 65 are disposed in the lower portions of the plates 43 and 44, and each of these grooves describes an arc that is somewhat greater than a semicircle with the center thereof located on the axis of the cylindrical cage 40. Slidably positioned in the grooves 65 is a trough 67 which is in the shape of a half cylindrical shell and forms a bottom for the cage 40. Four tie rods 143 interconnect the support plates 43 and 44 and serve to clamp the trough 67 between these plates. The trough 67 is concentric with the cage 40 and is positioned outside the cage immediately below the lower elongated members 60. As viewed in FIGURE 1, the upper left hand portion of the trough 67 is disposed slightly above the level of the horizontal diameter of the cage 40 and forms a discharge lip 68 which extends horizontally in a direction parallel to that of each of the elongated members 60.

A rectangular gravity return slide 69 is positioned within the cage 40 with the left portion thereof, as viewed in FIGURE 1, disposed beneath the discharge lip 68 of the trough 67. The slide 69 extends between the cage side walls 41 and 42 and slopes downwardly from adjacent the lip 68 toward the opposite portion of the trough 67. A first pair of mounting plates 70 and 71 extend integrally along one side of the slide 69 at right angles therewith, while a second pair of mounting plates 70 and 71 are similarly disposed along the opposite side of the slide 69. The mounting plates 70 and 71 are suitably affixed to side plates 43' and 44' which depend from the cage support plates 43 and 44, respectively, thereby firmly holding the slide 69 in a stationary position. The plate 43' is cut away to enable the delivery chute 32 to project therethrough. The slide 69 is provided with a cover 72 of relatively flexible material which is slightly larger than the slide 69 and forms a depending flap 73 along the upper edge of the slide 69 adjacent the lip 68 and a depending flap 74 along the opposite slide edge.

Positioned adjacent the discharge lip 68 of the trough 67 is an outfeed mechanism indicated generally at 80. The mechanism 80 includes a discharge plate 81 having one edge thereof in abutting relationship with the discharge lip 68. The plate 81 may be supported on the mechanism 80 in any suitable manner, such as by side plates 82 and 83. As best shown in FIGURE 3, the edge of the discharge plate 81 opposite that adjacent the lip 68 is arcuately shaped to accommodate a rotatable disc 84. The upper surface of the disc 84 is relatively smooth and forms an extension of the upper surface of the plate 81. These surfaces extend downwardly from the discharge lip 68 at a slight angle with respect to the horizontal. The disc 84 is supported by a circular plate 85 (FIGURE 1) which is mounted on a rotatable shaft 86. The shaft 86 is connected through suitable gearing in a gear box 149 to a disc drive pulley 87 which is adapted to be driven by means of a V-belt 88 and a motor 89.

The mechanism 80 is supported by a pedestal 150 disposed on the table 16. The upper surface of the pedestal 150 is inclined and extends in a plane perpendicular to the axial direction of the shaft 86. A plurality of removable shims 151 are positioned between the gear box 149 and the pedestal 150. By proper adjustment of the number and thickness of the shims 151, the mechanism 80 is maintained at all times in fixed relationship with respect to the discharge lip 68 of the trough 67.

Concentric with the disc 84 and mounted thereon is a ring 90 (FIGURES 1 and 3) which has an outer surface faced with rubber or other material having a relatively high frictional resistance to articles deposited on the disc 84. An elongated discharge chute 91 (FIGURES 3 and 4) is mounted on the outfeed mechanism 80 and includes an inclined bottom portion 92 which is substantially coplanar at its upper end with the disc 84. The upper end of the bottom portion 92 is positioned adjacent the disc 84, and the portion 92 slopes downwardly on the side of the disc 84 opposite that of the plate 81. The chute 91 also includes side portions 93 and 94 which extend upwardly from the bottom portion 92. The side portion 93 is substantially tangent to the disc 84 and has an arcuate extension 95 thereon which conforms to a portion of the circumference of the disc 84, as best shown in FIGURE 3. The extension 95 is connected at one end thereof to the upper end of the side portion 93 and at the other end thereof to a side wall 96 along one edge of the discharge plate 81. The side portion 94 of the chute 91 extends in a plane that is substantially tangent to the ring 90 on the disc 84.

The discharge plate 81 is provided with a side wall 180 adjacent the opposite edge thereof which extends in an angular direction, as viewed in FIGURE 3, from the right portion of the lip 68 to the circumference of the disc 84. The side walls 96 and 180 support a cover plate 81' which is disposed above the discharge plate 81 in spaced relationship therewith. An arcuate strip 95' is affixed at one end thereof to the cover plate 81' and extends over the portion of the disc 84 adjacent the extension 95. The strip 95' is secured at its other end to one end of an elongated strip 93' which forms a cover for the chute 91.

Disposed adjacent the upper portion of the discharge chute 91 is an arm 100 which, as shown in FIGURE 3, is in the shape of an inverted U with one leg susbtantially shorter than the other. The longer leg of the arm 100 forms an extension of the side portion 94 of the chute 91 and is pivotally connected thereto by a pin 101 or other suitable means. The bight of the U-shaped arm 100, along with the shorter leg thereof, are disposed above the disc 84 and include cut-away portions (not shown) along the lower edges thereof to provide sufficient clearance for the ring 90. The shorter leg of the arm 100 is positioned between two stops 102 and 103 which are affixed to a plate 104 mounted adjacent the upper edge of the side portion 94. The arm 100 is normally biased to the left, as viewed in FIGURE 3, by a leaf spring 105. In this position, the shorter leg of the arm 100 abuts the stop 102 while the longer leg is in substantial alignment with the side portion 94. One end of the spring 105 bears against the longer leg of the arm 100 while the other end of this spring is connected to a mircroswitch 106 mounted on the plate 104. The microswitch 106 includes a pin 107 which is normally biased to the left in abutting relationship with the spring 105 intermediate its ends. Two conductors 108 and 109 extend from the switch 106 and are connected in the circuit of the cage drive motor 58 (FIGURE 1). For purposes of clarity, these connections have not been shown in the drawings. The conductors 108 and 109 normally are maintained in electrically conductive relationship with each other by the switch 106 but are adapted to break the circuit for the motor 58 whenever the arm 100, together with the spring 105 and the switch pin 107, are moved to the right, as viewed in FIGURE 3.

A plurality of container caps or other articles to be ordered are dumped in random fashion into the delivery hopper 15 (FIGURES 1 and 2). These caps may have a relatively small diameter in relation to their height, such as the cap 110 of FIGURES 5–9. Or, they may have a relatively large diameter, as shown by the cap 111 in FIGURE 10. The caps in the hopper 15 flow by gravity along the bottom wall 20 and between the adjacent paddle arms 26 on the metering wheel 25. Upon energization of the cage drive motor 58, the V-belt 57 rotates the drive pulley 56 in a clockwise direction, as viewed in FIGURE 1, thereby similarly rotating the cylindrical cage 40 by means of the V-belt 53, the pulleys 51 and 52, the shafts 45 and 46, and the rollers 47 and 48. The rotation of the shaft 45 is transmitted by means of bevel gears 112 and 113 (FIGURE 2) the shaft 29, the V-belt 28 and the pulley 27 to the metering wheel shaft 24. The metering wheel 25 rotates in a counterclockwise direction, as viewed in FIGURE 2, and the caps between the arms 26 are thus fed down the delivery chute 32 to the trough 67. As the metering wheel 25 rotates, the paddle arms 26 thereon come in contact with the deflectors 30, and the deflectors skim over the caps between these arms, thereby providing an extremely effective metering of the number of caps that are fed to the trough 67 during each revolution of the wheel 25.

The caps falling down the delivery chute 32 from the metering wheel 25 are in a jumbled or disassociated condition. Some of the caps deposited in the trough 67 may be disposed in accordance with a selected orientation while others may not be so oriented. Thus, in the illustrated embodiment of the invention, it is desired to orient all of the caps with the open portion thereof facing upwardly and the closed or cover portion facing in a downward direction, and some of the caps at the bottom of the trough 67 may conform with this desired orientation while others may not.

As the cage 40 rotates, each of the elongated members 60 moves along the inner surface of the trough 67. The members 60 follow an arcuate path corresponding to the curvature of the trough 67. During the movement of the members 6, each member picks up a plurality of caps and pushes these caps upwardly toward the discharge lip 68 of the trough 67. As shown in FIGURES 5 through 9, the rod 61 of each of the members 60 engages a portion of the cap 110, for example, and carries it in an upward direction. When the cap 110 moves from the extreme bottom portion of the trough 67, whether the cap is properly oriented or not, the center of gravity of the cap is disposed on the side of the cap supporting rod 61 toward the upwardly curving portion of the trough 67. As a properly oriented cap 110 reaches the position shown in FIGURE 5 with the cover portion thereof adjacent the inner surface of the trough 67, the center of gravity CG of this cap is disposed on the side of the rod 61 adjacent the discharge lip 68 of the trough 67. As the rod 61 continues to push the properly oriented cap 110 upwardly, the cover portion of the cap pivots about the lip 68, as shown in FIGURE 6. Upon continued upward movement of the rod 61, the cap 110 moves outwardly onto the discharge plate 81 (FIGURE 7) in a properly oriented position with the cover portion facing in a downward direction and the open portion extending upwardly.

The cap 110 in FIGURES 8 and 9 is shown as reversed with respect to the desired cap orientation. That is, the cap 110 in these latter figures is disposed with its open end adjacent the inner surface of the trough 67. As the rod 61 of the elongated member 60 pushes the disoriented cap 110 upwardly toward the discharge lip 68, the center of gravity CG of this cap shifts (FIGURE 8) away from the side of the rod 61 adjacent the trough 67 to the opposite side thereof toward the center of the cage 40. Thus, as the cage 40 continues its rotation and moves the rod 61 closer to the discharge lip 68, the disoriented cap 110 tumbles over the rod 62, as shown in FIGURE 9, and falls backwardly into the cage. This cap drops onto the return slide 69 (FIGURE 1) and tumbles down the slide until it reaches the bottom of the trough 67, where it is again picked up by the rod 61 on one of the elongated members 60 and carried toward the discharge lip 68.

In a similar manner, as the cage 40 rotates, each of the members 60 advances a line of the caps 110 along the inner surface of the trough 67 toward the discharge lip 68. As each member 60 approaches this lip, the properly oriented caps 110 thereon move outwardly onto the discharge plate 81, while the improperly oriented caps fall in an opposite direction toward the center of the cage and are again carried along the trough 67 by one of the members 60 until such time as they become properly oriented. The side plates 43' and 44' (FIGURE 2) assist in the retention of the caps between the side walls 41 and 42 of the cage during the ordering operation. In addition to performing other functions to be described hereafter, the rod 62 of each elongated member 60, together with the return slide 69, insure that improperly oriented caps falling back into the cage 40 from a particular member 60 adjacent the discharge lip 68 will not strike the caps on other members 60 therebeneath and thereby knock these latter caps from the corresponding members.

The disc 84 (FIGURE 1) is continuously rotated at a relatively constant speed by the motor 89. The properly oriented caps coming from each of the elongated members 60 are disposed in a line which extends in a direction parallel to the longitudinal direction of the discharge lip 68. As each line of caps moves over the lip 68, the caps slide by gravity down the plate 81 onto the rotating disc 84 and into engagement with the outer surface of the ring 90. The angularly disposed end wall 180 of the plate 81 guides the caps on the right hand portion of the plate 81, as viewed in FIGURE 3, toward the disc 84. The frictional forces created by the engagement of the caps with the ring 90, together with the centrifugal forces exerted on the caps by the rotation of the disc 84, moves each cap in a counterclockwise direction, and the caps are led one by one to the discharge chute 91 where they are fed by gravity along the path formed by the chute 91 to a succeeding work station (not shown). The caps in the chute 91 are thus disposed in a single row which extends in a direction transverse to that of the line of caps coming over the discharge lip 68 from each of the elongated members 60.

As indicated heretofore, the cage 40 is driven by the rollers 47 and 48 which are disposed adjacent the upper portion of the cage, as viewed in FIGURES 1 and 2, and include tapered, circumferential surfaces thereon which frictionally engage the grooves 50 in the inner cylindrical surfaces of the annular side walls 41 and 42. This construction has many important advantages. For example, should a container cap or other article being ordered become jammed between one of the elongated members 60 and the inner surface of the trough 67, the horizontal axis of the cage 40 moves upwardly, and the grooves 50 become disengaged from the tapered surfaces of the rollers 47 and 48. The resulting slippage between these rollers and the cage side walls slows the rotation of the cage, and the upward cage movement enables the elongated member 60 to ride over the jammed cap. As soon as the cap clears, the axis of the cage 40 automatically returns to its initial position. The tapered circumferential surfaces of the rollers 47 and 48 again frictionally engage the side walls 41 and 42, and the ordering operation continues in a manner described above.

Should the caps adjacent the entrance to the chute 91 (FIGURES 3 and 4) build up and thereby fill the chute, the cage 40 is automatically adapted to shut down until the chute clears. Thus, upon build-up of the caps, the U-shaped arm 100 moves to the right, as viewed in FIGURE 3, against the tension of the spring 105, until its motion is arrested by the stop 103. As the arm 100 pushes the spring 105 against the microswitch pin 107, this pin is depressed and actuates the switch 106 to open the circuit between the conductors 108 and 109. As described above, the conductors 108 and 109 are connected in the power supply circuit for the cage drive motor 58 (FIGURE 1). Upon the opening of this circuit as a result of the jammed caps, the motor 58 shuts down and stops operation of the cage 40. As soon as the caps clear from the entrance to the discharge chute 91, the spring 105 automatically returns the arm 109 to its initial position with the shorter leg thereof abutting the stop 102. The pin 101 moves to the left, as viewed in FIGURE 3, thereby actuating the switch 106 to close the circuit between the conductors 108 and 109. Upon the closing of this circuit, the motor 58 is energized, and operation of the apparatus continues in the manner described above.

As indicated heretofore, the ordering apparatus quickly and easily may be adjusted to accommodate container caps of widely varying sizes, shapes, etc. To accomplish this adjustment, the bosses 63 and 64 for each of the members 60 are rotated to thereby vary the angular position of the rods 61 and 62 with respect to the surface of the trough 67 thereadjacent. Thus, for caps of a size and shape such that their centers of gravity are disposed farther to the right than the center of gravity CG of the cap 110 shown in FIGURE 5, the bosses 63 and 64 for each member 60 are rotated in a clockwise direction to thereby move each of the cap supporting rods 61 away from the adjacent surface of the trough 67. For caps of a configuration such that their centers of gravity are disposed farther to the left, the bosses 63 and 64 are rotated in a counterclockwise direction, thus moving the cap supporting rods 61 closer to the trough 67. Upon further counterclockwise rotation of bosses 63 and 64, the rods 62 of the members 60 are adapted to contact the caps and serve as the support therefor, thereby providing an additional adjustment of the position of that part of each member 60, with respect to the cap center of gravity, which is adapted to contact the caps. By proper adjustment of the angular position of the members 60, the apparatus may be adapted to properly order container caps or other articles of extremely wide dimensional variation.

Referring now to FIGURE 10 of the drawings, there is shown an alternative elongated member 115 that may be substituted for each of the elongated members 60. The member 115 comprises an angle iron 116 that is welded or otherwise rigidly affixed at each end thereof to the respective inner faces of two rotatable bosses 117 (only one of the bosses 117 being visible in FIGURE 10) mounted along the periphery of the side walls 41 and 42, respectively, of the cylindrical cage 40. The axial centers of the bosses 117 are each disposed inside the angle formed by the diverging legs of the iron 116. Upon rotation of the cage 40, each angle iron 116 moves along the inner surface of the trough 67 and carries a plurality of container caps or other articles to be ordered toward the discharge lip 68, where the properly oriented caps move outwardly onto the discharge plate 81 while the centers of gravity CG of the improperly oriented caps are shifted, in a manner similar to that described heretofore with respect to the elongated members 60 (FIGURES 5–9), so that these latter caps fall inwardly toward the center of the cage. The angular cross-sectional configuration of the angle iron 116 permits a wide variation in the particular location of the portion thereof which is adapted to contact the container cap. As shown in FIGURE 10, the cap 111 is in engagement with the surface of angle iron 116 along the outer portion of one leg thereof. Upon rotation of the bosses 117, the iron 116 is rotated about the axial centers of these bosses to permit various other surfaces of the angle iron 116 to contact the cap thereon. Thus, counterclockwise rotation of the bosses 117 permits the apex of the angle iron 116, for example, to act as the supporting surface for the cap, while clockwise rotation of the angle iron 116 through a suitable arc enables the opposite leg thereof to contact the cap. By altering the angular position of the iron 116, the spacing between the cap supporting surface thereof and the trough 67 is varied. In this manner, the member 115 may be adjusted to enable the apparatus to properly order container caps of various sizes and shapes.

As indicated above, the axial centers of the bosses 117 in the FIGURE 10 embodiment of the invention are disposed inside the angle formed by the diverging legs of the iron 116. In other good embodiments, these axial centers may be located on the outside of this angle. Thus, in one particularly advantageous arrangement, the axial centers of the bosses 117 are located on the outside of the angle adjacent the outer portion of one of the diverging legs. With this construction, an extremely wide variation in the spacing between the cap supporting surface of the iron 116 and the trough 67 is attained upon rotation of the bosses 117.

For many applications of the invention, particularly when it is desired to properly orient relatively large container caps or other articles, the discharge lip 68 of the trough 67 advantageously is disposed at a level above the horizontal diameter of the cage 40, as shown in the drawings. As the elongated members (such as the members 60 in FIGURES 1–9 or the member 115 in FIGURE 10) advance the caps upwardly toward the lip 68 and the properly oriented caps begin to move onto the discharge plate 81, the elongated members begin to describe a negative arc with respect to these caps. As a result, the caps tend to roll smoothly over the discharge lip 68 onto the plate 81, thereby greatly facilitating delivery of the properly oriented caps to the outfeed mechanism 80.

In certain other good embodiments, particularly for relatively small container caps, the discharge lip 68 of the trough 67 is disposed at the approximate level of the horizontal diameter of the cage 40, and in some instances the lip 68 may be located below this diameter level. The preferred relative position of the lip 68 and the horizontal diameter of the cage depends to some extent on the size of the container caps to be ordered. In order to adjust this relative position for caps of a particular size, the four tie rods 143 on the support plates 43 and 44 are loosened, and the trough 67 is rotated about its center in the grooves 65 on the inner surfaces of the cage side walls 41 and 42, thereby raising or lowering the discharge lip 68 with respect to the horizontal diameter of the cage 40. The rotatable disc 84 and the discharge plate 81 likewise are raised or lowered by means of the shims 151 to conform to the adjusted position of the lip 68.

For many purposes, ordering apparatus of the type described above are frequently operated at relatively slow speeds. As an illustration, in one satisfactory ordering apparatus, the cylindrical cage 40 is rotated at a speed of 5 or 6 revolutions per minute. In this illustration, the cage 40 is 4 feet long and 30 inches in diameter, and the disc 84 is rotated at a speed such that the ratio between the peripheral speed of the disc and that of the cage is slightly greater than 10 to 1. Even at this relatively slow cage speed, the apparatus delivers properly oriented container caps to the discharge chute 91 at a rate of approximately 2000 caps per minute. Of course, these figures are purely illustrative, and other operating speeds, dimensions, outfeed rates, etc., may be employed without departing from the spirit and scope of the invention.

The terms and expressions which have been employed are used as terms of description and not of limitation, and there is no intention in the use of such terms and expressions, of excluding any equivalents of the features shown and described, or portions thereof, it being recognized that various modifications are possible within the scope of the invention claimed.

What is claimed is:

1. An apparatus for ordering a plurality of articles, comprising, in combination, a rotatable cylinder, said cylinder including a pair of annular side walls and a plurality of elongated members interconnecting said side walls, said elongated members being positioned in spaced relationship along the periphery of said cylinder and extending in a direction parallel to the axis thereof, each of said elongated members having an article-engageable portion thereon, through means disposed about a portion of said cylinder and concentric therewith, said trough means including a discharge portion thereon, feeding means for delivering a random supply of articles to be ordered to said trough means, support means cooperating with the inner, cylindrical surfaces of the side walls of said cylinder for permitting movement thereof in a direction away from said trough means and for rotating said cylinder relative to said trough means to advance said elongated members along said trough means toward the discharge portion thereof, said members being adapted to carry the articles in said trough means toward said discharge portion during the advance thereof, to thereby shift the center of gravity of all but those articles of a selected orientation away from said discharge portion until the unstable condition thereof is attained so that they fall from said members, said cylinder moving away from said trough means in response to the jamming of an article between said trough means and one of said elongated members, to thereby free the jammed article, means adjacent said discharge portion for receiving the articles on said members conforming to said selected orientation, and means for varying the position of the article-engageable portion on each of said members relative to said side walls.

2. An apparatus of the character set forth in claim 1, in which each of said elongated members includes a pair of spaced, parallel rods, the adjacent ends of said pair being respectively connected to said side walls.

3. An apparatus for ordering a plurality of articles, comprising, in combination, a cylinder rotatable on an horizontal axis, said cylinder including a pair of spaced-apart side walls and a plurality of elongated members of angular cross-section interconnecting said side walls and extending in a direction parallel to the axis of said cylinder, said elongated members being positioned in spaced relationship along the periphery of said side walls, feeding means for delivering a random supply of articles to be ordered to said cylinder, trough means disposed about and concentric with said cylinder for confining said articles in the lower portion thereof, said trough means including a discharge lip thereon disposed at a level higher than the horizontal diameter of said cylinder, means for rotating said cylinder relative to said trough means to successively advance said elongated members along said trough means toward said discharge lip, said members carrying a plurality of the articles in said trough means toward said discharge lip during the advance thereof, and means adjacent said discharge lip for receiving only the articles on said members which conform with a selected orientation.

4. An apparatus for ordering a plurality of articles, comprising, in combination, a cylinder rotatable on an horizontal axis and having a delivery opening therein, said cylinder including a pair of annular, spaced-apart side walls having grooved inner cylindrical surfaces thereon and including a plurality of elongated members interconnecting said side walls and extending in a direction parallel to the axis of said cylinder, said elongated members being positioned in spaced relationship along the periphery of said side walls, each of said elongated members having an article-engageable portion thereon, feeding means for delivering a random supply of articles to be ordered to said cylinder through said delivery opening, trough means disposed about and concentric with said cylinder for confining said articles in the lower portion of said cylinder, said trough means including a discharge lip thereon, support means cooperating with the inner, cylindrical surfaces of the side walls of said cylinder for permitting movement thereof in a direction away from said trough means and for rotating said cylinder relative to said trough means to successively advance said elongated members along said trough means toward said discharge lip, each of said article-engageable portions carrying a plurality of the articles in said trough means toward said discharge lip during the advance thereof, to thereby shift the center of gravity of all but those articles of a selected orientation away from said discharge lip until the unstable condition thereof is attained so that they fall from the corresponding member, the articles remaining on each of said members being properly oriented in accordance with said selected orientation and disposed in a uniform row, said support means including a plurality of roller members disposed in frictional engagement with the grooves in the inner, cylindrical surfaces of said side walls, means adjacent said discharge lip for receiving said properly oriented articles, and means for varying the position of the article-engageable portion on each of said members relative to said side walls.

5. An apparatus for ordering a plurality of articles, comprising, in combination, a cylinder rotatable on an horizontal axis, said cylinder including a pair of spaced-apart side walls and a plurality of elongated members interconnecting said side walls and extending in a direction parallel to the axis of said cylinder, said elongated members being positioned in spaced relationship along the periphery of said side walls, feeding means for delivering a random supply of articles to be ordered to said cylinder, trough means disposed about and concentric with said cylinder in spaced relationship with said elongated members for confining said articles in the lower portion of said cylinder, said trough means including a discharge lip thereon disposed at a level higher than the horizontal diameter of said cylinder, said discharge lip being movable relative to the axis of said cylinder to thereby adjust the level of said lip with respect to said diameter, means for rotating said cylinder relative to said trough means to successively advance said elongated members along said trough means toward said discharge lip, said members carrying a plurality of the articles in said trough means toward said lip during the advance thereof, and means adjacent said discharge lip for receiving only the articles on said members which conform with a selected orientation.

6. An apparatus of the character set forth in claim 5, in which each of said elongated members comprises a pair of spaced, parallel rods, the rods adjacent said trough means being disposed in spaced, juxtaposed relationship therewith, and means rotatably mounted along the periphery of each of said walls for respectively connecting the adjacent ends of each said pair to said side walls, said rotatably mounted means being adapted upon rotation to vary the spacing between said trough means and said rods.

7. An apparatus for ordering a plurality of articles, comprising, in combination, a cylinder rotatable on an horizontal axis and including a pair of annular, spaced-apart side walls disposed in substantially parallel, vertical planes, one of said side walls having a delivery opening therein, and said cylinder including a plurality of elongated members interconnecting said side walls and extending in a direction parallel to the axis of said cylinder, said elongated members being positioned in spaced relationship along the periphery of said side walls, each of said elongated members having an article-engageable portion thereon, feeding means for delivering a random supply of articles to be ordered to said cylinder through said delivery opening, trough means disposed about and concentric with said cylinder for confining said articles in the lower portion of said cylinder, said trough means being disposed in spaced, juxtaposed relationship with the elongated members thereadjacent and including a discharge lip thereon, means for adjusting the positions of the article-engageable portions on said elongated members relative to said side walls, rotary means cooperating with the inner, cylindrical surfaces of the side walls of said cylinder for permitting movement thereof in a direction away from said trough means and for rotating said cylinder relative to said trough means to successively advance said elongated members along said trough means toward said discharge lip, said members carrying a plurality of the articles in said trough means toward said discharge lip during the advance thereof, all but those articles of a selected orientation falling from the corresponding member as the articles are carried toward said discharge lip, said cylinder moving away from said trough means in response to the jamming of an article between said trough means and one of said elongated members, to thereby free the jammed article, and means adjacent said discharge lip for receiving the articles on said members conforming to said selected orientation.

8. An apparatus for ordering a plurality of articles and feeding the same along a path, comprising, in combination, a cylinder rotatable on an horizontal axis and having a delivery opening therein, said cylinder including a pair of circular, spaced-apart side walls disposed in substantially parallel, vertical planes and a plurality of elongated members interconnecting said side walls and extending in directions parallel to the axis of said cylinder, said elongated members being positioned in spaced relationship along the periphery of said side walls, each of said elongated members being of angular cross-section and having a bearing surface thereon, feeding means for delivering a random supply of articles to be ordered to said cylinder through said delivery opening, trough means disposed about and concentric with said cylinder for confining said articles in the lower portion of said cylinder, said trough means including a discharge lip thereon, the bearing surfaces on the elongated members adjacent said trough means being disposed in spaced, juxtaposed relationship therewith, each of said members being rotatable to thereby vary the spacing between the bearing surface thereof and said trough means, means for rotating said cylinder relative to said trough means to successively advance said elongated members along said trough means toward said discharge lip, the bearing surface on each of said members engaging a plurality of the articles in said trough means and carrying the same toward said discharge lip during the advance thereof, all but those articles of a selected orientation falling from the corresponding member as the articles are carried toward said discharge lip, the articles remaining on each of said members being properly oriented in accordance with said selected orientation and disposed in a uniform row, and means adjacent said discharge lip for receiving said properly oriented articles.

9. An apparatus for ordering a plurality of articles and feeding the same along a path, comprising, in combination, a cylinder rotatable on an horizontal axis, said cylinder including a pair of annular, spaced-apart side walls and a plurality of elongated members interconnecting said side walls and extending in a direction parallel to the axis of said cylinder, said elongated members being positioned in spaced relationship along the periphery of said side walls, each of said elongated members having an article-engageable portion thereon, metering means for delivering a random supply of articles to be ordered to said cylinder at a uniform rate, trough means disposed about and concentric with said cylinder in spaced relationship with the elongated members thereadjacent for confining said articles in the lower portion of said cylinder, said trough means including a discharge lip thereon, adjusting means for varying the positions of the article-engageable portions on said adjacent elongated members relative to said side wall, support means cooperating with the inner, cylindrical surfaces of the side walls of said cylinder for permitting movement thereof in a direction away from said trough means and for rotating said cylinder relative to said trough means to successively advance said elongated members along said trough means toward said discharge lip, each of said members carrying a plurality of the articles in said trough means toward said discharge lip during the advance thereof, to thereby shift the center of gravity of all but those articles of a selected orientation away from said discharge lip until the unstable condition thereof is attained so that they fall from the corresponding member, the articles remaining on each of said members being properly oriented in accordance with said selected orientation and disposed in a uniform row, said cylinder moving away from said trough means in response to the jamming of an article between said trough means and one of said elongated members, to thereby free the jammed article, and means adjacent said discharge lip for receiving the properly oriented articles from each member and feeding them along said path.

10. An apparatus for ordering a plurality of articles, comprising, in combination, a cylinder rotatable on an horizontal axis and including a pair of annular side walls and a plurality of elongated members interconnecting said side walls, said elongated members being positioned in spaced relationship along the periphery of said cylinder and extending in a direction parallel to said axis, each of said elongated members being of angular cross-section and including a bearing surface thereon, feeding means for delivering a random supply of articles to be ordered to said cylinder, trough means disposed about and concentric with said cylinder for confining said articles in the lower portion thereof, said trough means including a discharge portion thereon, support means cooperating with the inner, cylindrical surfaces of the side walls of said cylinder for permitting movement thereof in a direction away from said trough means and for rotating said cylinder relative to said trough means to successively advance said elongated members toward the discharge portion of said trough means, the bearing surface on each of said members engaging a plurality of the articles in said trough means and carrying the same toward said discharge portion during the advance thereof, to thereby shift the center of gravity of all but those articles of a selected orientation away from said discharge portion until the unstable condition thereof is attained so that they fall from the corresponding member, said cylinder moving away from said trough means in response to the jamming of an article between said trough means and one of said elongated members, thereby freeing the jammed article, means adjacent said discharge portion for receiving the articles on said members conforming to said selected orientation, and means for rotating each of said elongated members to vary the spacing between the bearing surface thereof and said trough means.

References Cited in the file of this patent

UNITED STATES PATENTS

| | | |
|---|---|---|
| 847,451 | Wilmore | Mar. 19, 1907 |
| 1,127,520 | Rosen | Feb. 9, 1915 |
| 1,185,329 | Janisch | May 30, 1916 |
| 1,916,255 | Cabot | July 4, 1933 |
| 2,453,736 | Woodberry | Nov. 16, 1948 |
| 2,571,576 | Hopkins | Oct. 16, 1951 |
| 2,629,481 | Stover | Feb. 24, 1953 |

OTHER REFERENCES

Thomas (German application), DAS 1,012,251, July 11, 1957.